United States Patent Office 3,439,849
Patented Apr. 22, 1969

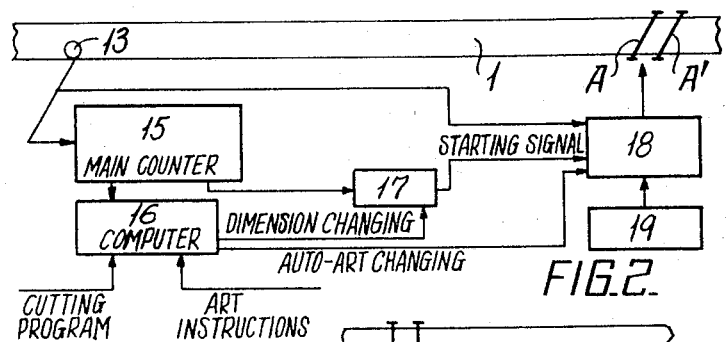
FIG.2.
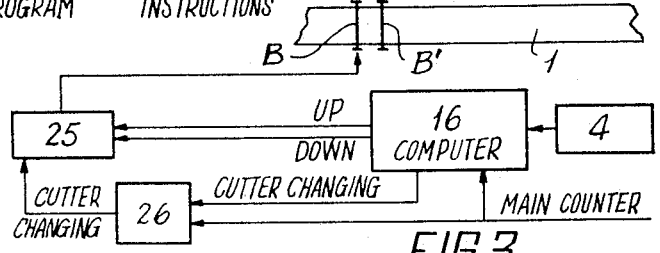
FIG.3.
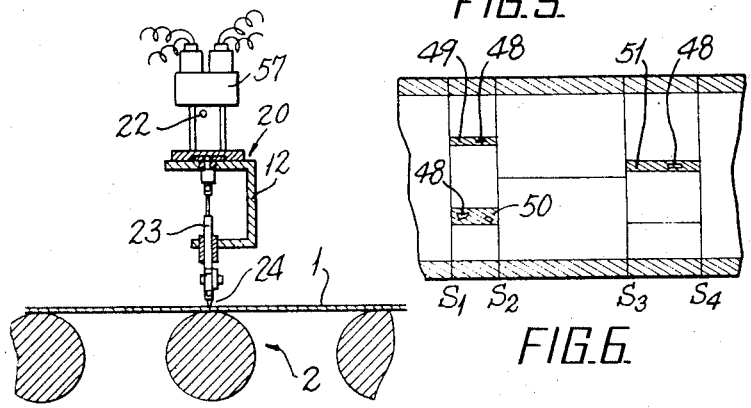
FIG.4.
FIG.6.
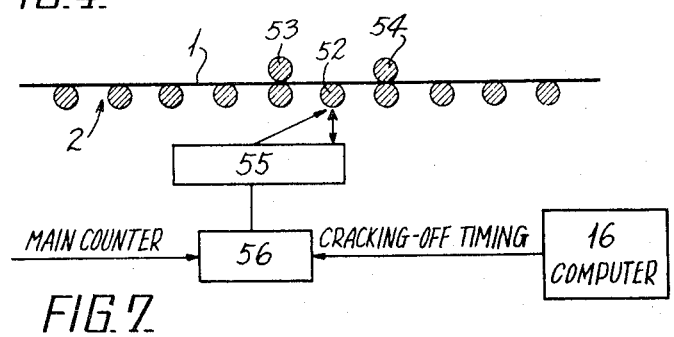
FIG.7.

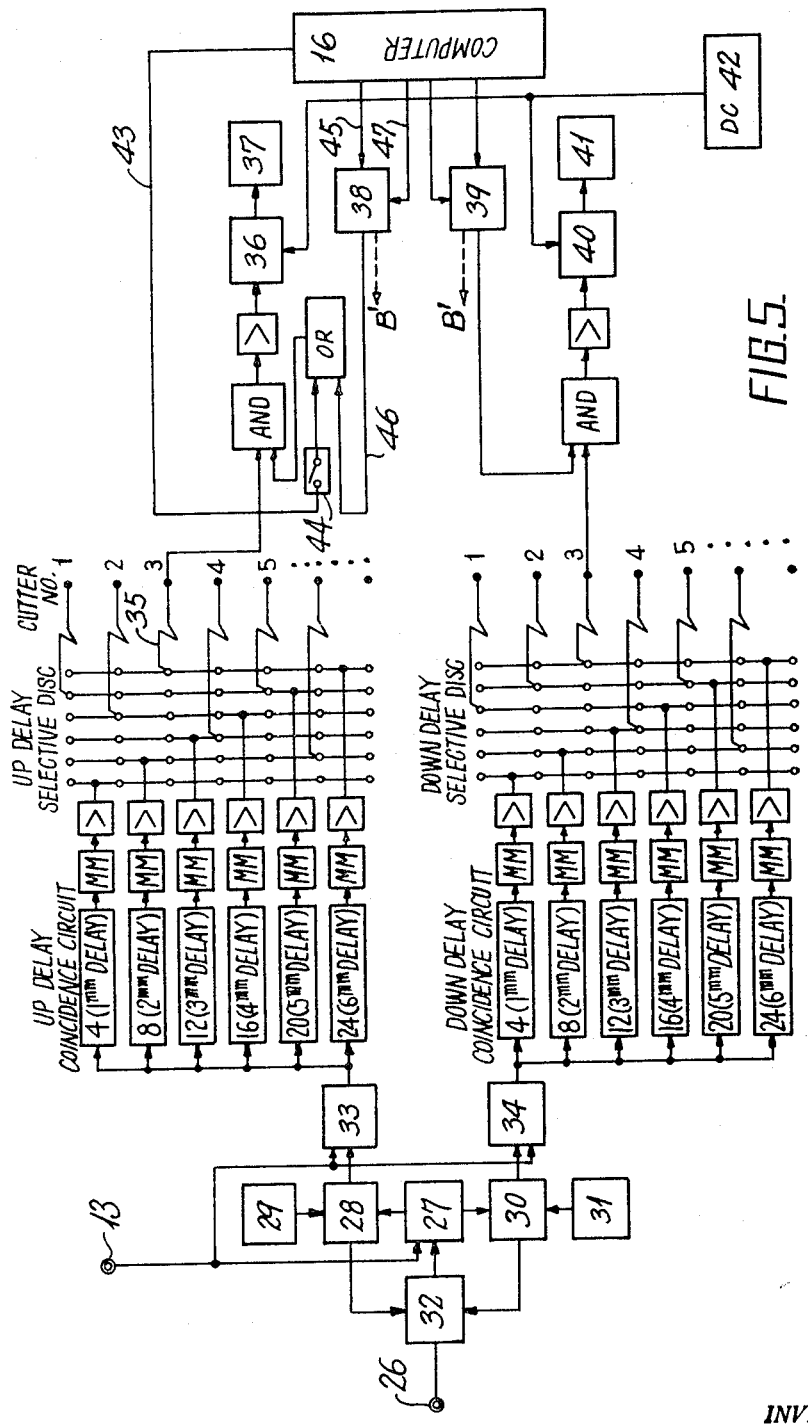

3,439,849
APPARATUS FOR AUTOMATICALLY CUTTING
A GLASS SHEET
Teizo Matsuzaki, Kuniyuki Minami, and Yoshiaki Sasagawa, Yokohama, Japan, assignors to Asahi Glass Co., Ltd., Tokyo, Japan, a corporation of Japan
Filed Aug. 24, 1966, Ser. No. 574,682
Claims priority, application Japan, Aug. 27, 1965, 40/51,963; Nov. 2, 1965, 40/66,876
Int. Cl. B65h 35/10; B26f 3/00
U.S. Cl. 225—96.5                                           5 Claims

ABSTRACT OF THE DISCLOSURE

An apparatus for automatically cutting a glass sheet is combined with a computer for first transversely scoring said sheet, secondly longitudinally scoring said sheet between the transverse scores to enclose defects within the score lines, and finally breaking said sheet on the score lines.

---

The present invention relates to an apparatus for cutting glass sheet continuously and automatically and, more particularly, to an apparatus for transversely scoring and longitudinally scoring glass sheet containing defects while avoiding such defects in a most reasonable assortment of product in the course of the transfer of said sheet glass.

In the glass sheet formed of molten glass, there are entailed defects such as bubbles, veins or cords, striae, stones and like impurities generally included in the glass material and also defects generated on the surface of glass sheet in various manners. Location, kind, and size of such defects vary at all times and these are almost impossible to predict. Furthermore, these defects are very wide in diversity from those extremely microscopic and accordingly not greatly affecting the value of glass sheet to those which must be avoided in every way.

These defects which are usually scattered in the glass sheet directly affect the glass sheet in case it is cut into predetermined small sizes. Accordingly, it is impossible to cut a formed and finished glass sheet in assortment or arrangement without regard to such defects.

For this reason, in cutting glass sheet having such defects, it is desirable to selectively combine largest ones from the area having no defects of the glass sheet to be cut, possibly reduce the defective part to be discarded and thereby to raise the production yield.

In cutting a continuously formed glass sheet into predetermined sizes in the course of its transfer, i.e., in a cycle of so-called streamlined operations, detection of said defects, selection of reasonable assortment not containing such defects in the product, and transverse scoring and longitudinal scoring practically in accordance with said selected assortment should be made precisely and exactly in a very short period of time. Consequently, its process control is very difficult.

The primary object of the present invention is to provide an apparatus for continuously cutting glass sheet, in which the glass sheet is transversely scored and subsequently longitudinally scored in the area defined by the scored lines on the transversely scored glass sheet, by performing said process control fully automatically by means of a computer while avoiding defects scattered in the glass sheet and in a most reasonable assortment of product selected so as to obtain the highest yield.

Although the yield of cutting may be the highest, efficiencies such as effected by mechanical means, processes after cutting, or manual operation cannot be neglected from a view point of the efficiency of the whole cutting operation. Of more importance is that it is of no significance of the production of glass sheet, that is, assortment of obtained products will not meet the demand of customers. According to numerous experiences, the contents of demand are very complicated in the amount of demand, the kind of size, and delivery time of glass sheet, and moreover, these contents are often liable to variate. In conventional cutting apparatuses, it has been difficult to associate these contents of demand or their variation directly with the cutting operation including assortment of product, and as a result thereof, there give rise to stock increase or shortage in product thereby causing a great obstacle for the production and stock management of the glass production.

Another object of the present invention is to provide a cutting apparatus of glass sheet which is adapted for associating the contents of demand and their variation directly with the cutting operation, and by which defects can be avoided on the basis of defect information detected during the transfer of the glass sheet having defects in predetermined direction by a conveyor, and a most reasonable assortment of product is selected and all control of apparatus associated with transverse scoring and longitudinal scoring actually effected in this selected assortment is carried out entirely by way of a computer.

In order to accomplish the above-mentioned objects, the present invention is characterized in that it comprises a conveyor means for feeding glass sheet in predetermined direction and means for detecting the defects scattered in the glass sheet in the course of its tranfer by said conveyor, and also having means for transversely scoring and longitudinally scoring the glass sheet in compliance with the most reasonable assortment of product selected on the basis of information on the defects and cutting programme thereby automatically controlling these means substantially by means of a computer.

Another feature of the present invention is to score the glass sheet being carried forward by a conveyor in predetermined direction transversely and continuously and to produce longitudinal score lines exactly in the area defined by the transverse score lines on the glass sheet in continuity without being cracked-off along said transverse scored lines in a most advantageous manner while avoiding said defects. According to the present invention, glass sheets of various sizes to be cut are separated into groups of sheets of different thickness and further sheet groups for each same longitudinal dimension, and cutting programme for in-putting into a computer is prepared.

For sheet group of longitudinal dimension preferential order is given in consideration of delivery time, kind of dimension, quality and the like, and for each glass included in a group of glass sheets, value of product is estimated in accordance with sheet width, magnitude of dimension, price, and appropriateness of assortment. With such preferential order and the estimated value as the basis for reference for transverse scoring and longitudinal scoring, the computer can determine the most advantageous assortment of product while avoiding defects scattered in the glass sheet.

In order to enable the invention to be more readily understood, reference is now made by way of example to the accompanying drawings which illustrate diagrammatically a preferred embodiment thereof and in which:

FIG. 2 is a schematic diagram showing a controlling method of the transverse scoring apparatus according to the present invention;

FIG. 3 is a schematic diagram showing a controlling method of the longitudinal scoring apparatus;

FIG. 4 is an enlarged view of a longitudinal cutter which constitutes the longitudinal cutting apparatus;

FIG. 5 is a schematic wiring diagram of controlling up and down movement of said longitudinal cutter;

FIG. 6 is a fragmentary view showing one embodiment of the transversely scored and longitudinally scored glass sheet according to the present invention; and FIG. 7 is a view of the apparatus for cracking off the transversely scored and longitudinally scored glass sheet along transversely scored lines.

In the drawings:

Figure 1:
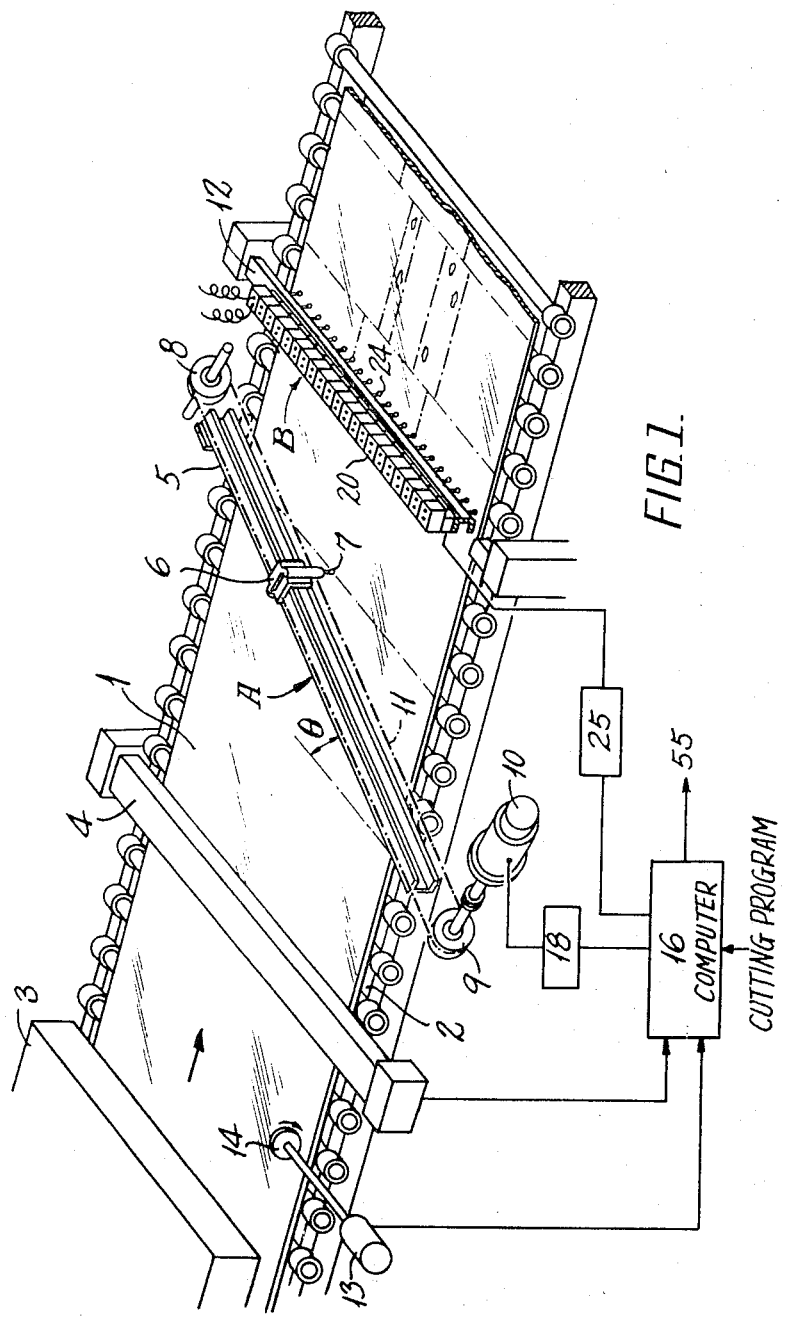
FIG. 1 is a perspective view schematically showing the whole construction of a cutting apparatus according to the present invention which comprises a detection means of defects scattered in glass sheet, transverse scoring means, and longitudinal scoring means.

As shown in FIG. 1, a glass sheet 1 which has been formed of molten glass or further submitted to necessary treatment such as finishing and washing is carried forward by a conveyor 2 in predetermined direction. In said glass sheet, there are scattered defects due to bubbles, veins or cords, striae, stones and like impurities generally included in the glass or external defects produced on the surface of glass sheet. Location, kind, and size of these defects may be sorted into spotty defects and linear defects according to the manner of distribution. The defects thus scattered in the glass sheet are inspected continuously in an inspection chamber 3 which is provided along the transfer path of glass sheet in the front part of the cutting stage. The inspection of defects can be made optically and automatically but normally it is performed strictly by man's sight and marks are provided for instance in ink for convenience on the spots where such defects are existent. Among the defects scattered in the glass sheet, those which are not in conformity with the standard fixed depending on the usage of the glass sheet are all inspected in this inspection chamber 3 and marked. In that case, linear defects distributed over relatively wide range are marked continuously by letting a brush go down to their corresponding position. A defect reading means 4 is provided at the rear part of said inspection chamber 3 and when the glass sheet 1 advances and reaches said position, it automatically reads the marks. Reading of the defect marks is made usually by use of a photoelectric tube (not shown), for example, at every one inch (25.4 mm.) both longitudinally and transversely. That is, said defect reading means 4 consists of a multitude of photoelectric tubes lined up at intervals of one inch (25.4 mm.) all over the width of the glass sheet, and reads marks given in the inspection chamber 3 by means of these photoelectric tubes over the entire width of the glass sheet in the course of advancing of the glass sheet, the result of reading being input in the computer 16 as a defect information every one inch (25.4 mm.) as the glass sheet advances.

The computer remembers the defect information precisely in sequence, learns exactly the location of defects scattered in the glass sheet and at the same time, selects the most advantageous assortment of product from among the prepared cutting programme and enters virtual cutting lines or scoring lines in the interior of the computer. Thus, when the glass sheet advances, a transverse scoring apparatus A and a longitudinal scoring apparatus B are operated in a manner hereinafter described, and actual score lines are provided at the corresponding position of the said virtual score lines on the glass sheet.

Reference will now be made to the manner of controlling the transverse scoring apparatus A on the basis of FIG. 2.

As may be seen apparently in FIG. 1 the transverse scoring apparatus A has a guide rail 5 disposed obliquely at an angle of $\theta$ to a direction perpendicular to the advancing direction of the glass sheet, a cutter bed 6 is mounted on said guide rail 5 so as to reciprocally move by means of an endless chain 11 passing around pulleys or gears 8, 9. The gear 9 is rotated by a drive motor 10 thereby to allow a cutter 7 attached to the cutter bed 6 to run proportionately to the speed of the glass sheet.

In this embodiment as it is required that the condition of the entire apparatus is to be grasped precisely at all times by the computer a main counter 15 which translates it into pulses and counts them is provided. This main counter 15 is very important as all bases for computer control. Describing it now in more detail the marching speed of the glass sheet 1 is measured by a roll 14 (FIG. 1) and is transferred to pulse numbers by a pulse generator 13 which generates one pulse for example at every 0.01 inch (0.254 mm.) advance of the glass sheet and these pulse numbers are counted by the main counter 15 the thus-obtained result being transmitted to a computer 16 for example at every 50 cm. advance of the glass sheet. The computer 16 in accordance with counting of pulses corresponding to the speed of the glass sheet from the pulse generator 13 selects the longitudinal dimension of the glass sheet subsequently to be cut from among the cutting programme in reference to the preferential order.

Provision of its dimension may be made in such a manner for example that the coming of next transverse score line to be produced is judged by presuming the number to be reached by the main counter and the obtained value is entered the coincidence circuit 17. The coincidence circuit 17 sends a starting signal to the transverse scoring apparatus A through a transverse scoring controller 18 when dimension indicating signal from the computer 16 comes in accord with signal from the main counter 15. By repeating such operations it is possible to produce the score lines transversely in sequence at predetermined intervals. Further in the present apparatus the longitudinal dimension of the glass sheet subsequently to be cut is normally automatically set by the computer 16. However for instance in case a large sheet is to be obtained or said automatic setting becomes temporarily inoperative it is possible to set the longitudinal dimension freely by changing it to manual operation and by means of set-dial 19. A' (refer to FIG. 2) is an auxiliary or reverse transverse scoring apparatus. When the present apparatus A is not available for use it can be instantly replaced with the auxiliary apparatus A' automatically by a computer or manually. The longitudinal scoring apparatus B is constituted by providing a unit cutter 20 as shown in FIG. 4 on a cutter supporting frame 12 (refer to FIG. 1) bridged across said glass sheet for example at an interval of one inch (25.4 mm.) over the entire width of the glass sheet. These unit cutters 20 are respectively and separately movable upwards and downwards and brought into contact with or out of contact with the surface of the glass sheet by a mechanism consisting of air cylinders operable by an electromagnetic valve, and said mechanism is accommodated in a housing 57 fixed to the cutter supporting frame 12. Said air cylinders are respectively connected to compression air intake pipe 22, and an operating rod 23 is moved up and down by operating the compression air by means of the electromagnetic valve, and thus, a cutter wheel 24 fitted to the tip end of the said rod 23 comes in contact with or out of contact with the surface of the glass sheet.

As the longitudinal scoring apparatus B is constituted as described, the longitudinal scoring position relative to the glass sheet is obtained by selective combination of these unit cutters 20, in which case, the cutter which is to be employed is selected by the computer. That is to say, the computer, in consideration of location of defects scattered in the glass sheet, selects and combines several glass sheets belonging to the group of glass sheets of transverse dimension at that time so as not to contain the defects from among the cutting programme on the basis of the value of each glass sheet and determines the longitudinal scoring position such that the accumulation of values of these glass sheets becomes the highest, and thereby gives instructions to the cutter corresponding to this longitudinal position.

Since, in this case, the position of defects scattered in the glass sheet are not definite and width of glass sheet matically by a changing signal 47 from the computer 16 by means of a changer 38 for rising.

The selective circuit of the unit cutter takes out OR of a selective signal 46 for raising the third cutter, which is emitted from the computer 16 and passes through a lead wire 45 and a changer 38 for rising, and of a signal 43 for raising all fallen cutters simultaneously and sends it to AND circuit. The AND circuit takes AND of the signal from the OR circuit 6 mm. delay coincidence signal of the delay selective disc and sends the signal to a coil switch 36 for rising, in which case a signal 43 closes a switch 44 and connects only when the cutter is falling and then only to the OR circuit of the falling cutter is sent to a signal 43 so that, when replacing a cutter, if there is a cutter to be employed in the next longitudinal scoring in sequence, the said cutter will not rise but remains in contact with the glass sheet.

In this manner, the cutter, when the selective signal of the cutter for rising and the timing signal for rising would come in accord in the AND circuit, its electromagnetic valve coil 37 is energized and moves upward. Such OR circuit and AND circuit are provided respectively for each unit cutter and similarly controlled. Reversely, also when the cutter falls, the same will apply substantially as in the case of rising.

FIG. 6 shows a part of glass sheet actually transversely and longitudinally scored by the longitudinal scoring apparatus B and the transverse scoring apparatus A, controlled by such method. The longitudinal scoring position varies with every area defined by two adjacent transversely scored lines, because the defects 48 scattered in the glass sheet vary with the transversely scores lines $S_1$, $S_2$, $S_3$, $S_4$ produced by the transverse scoring apparatus A, and further, assortment of said longitudinal scored lines is determined by the computer while avoiding said defects so as to make such assortment most advantageous. However, the longitudinal scoring apparatus B can change a unit cutter to be used at every transverse scored line and produces longitudinal scored lines precisely in the area defined by the transversely scored lines of the glass sheet in the course of its transfer. Furthermore, the computer, when in changing of a cutter even any one spotty defect 48 is found in the area defined by two adjacent transversely scored lines, will assume said area as if its whole part of longitudinal scoring direction had defects and selects the longitudinal scoring position to be able to discard said whole part in rectangular pieces 49, 50 and 51. It is clear that width of the above-described rectangular pieces 49, 50, 51 will vary with the size of the defect, and in addition minimum width thereof can always be maintained possible to be cracked-off by force of the cracking apparatus. This minimum width varies depending on the thickness of glass sheet, for example, approximately one inch (25.4 mm.) is sufficient for glass sheet of 3 mm. thickness. Therefore, even though the defect is less than one inch (25.4 mm.) in width, one inch (25.4 mm.) width glass sheet will be discarded. Furthermore, since the edges of a ribbon glass sheet are usually unsatisfactory in quality and not capable of obtaining normal product, the longitudinal scoring cutter may be set so as to cut away these edges assuming that said portions contain defects along certain width in continuity.

FIG. 7 shows one embodiment of the apparatuses for automatically cracking-off a transversely and longitudinally scored sheet glass as shown in FIG. 6 along the transverse scored lines. This cracking-off means is constructed so that the glass sheet scored by both transverse score lines and longitudinal score lines is loosely fixed with fixing rolls 53, 54 on the conveyor 2 and the cracking-off roll 52 provided intermediate these fixed rolls so as to abut the under face of the glass sheet is moved up and down in good timing and intermittently when the transverse scored line should come immediately above said cracking-off roll 52, thus the glass sheet is cracked-off by its impact force. This means is provided in the back (not shown) of the above described longitudinal scoring device B. The computer 16 can also control this cracking-off means. The computer 16 decides the value when this transverse scored line passes immediately above the cracking-off roll 52 from the counting value of the main counter at the time when the transverse scoring device A scores transversely and enters the value in the coincidence circuit 56. Thus, when counting of the coincidence circuit just comes in accord with the set value, it sends instructions for raising cracking-off roll 52 against a sheet glass cracking-off controller 55.

The cracking-off roll 52 which has not been operating positively against the glass sheet 1 raised by this instructions, imparts upward striking force to approximately opposite part of the transverse scored line underneath the glass sheet, and cracks-off the glass sheet along the transverse scored line. At this moment, the cracking-off roll 52 actuates only in the direction of the transverse scored line so that the cracked-off glass sheet pieces without being cracked-off on the longitudinal scored line are carried to the subsequent stage.

While we have illustrated in the above description and drawings specifically the case when continuous glass sheet is being cut, it is apparent that the present cutting apparatus may apply without any modification to the transverse scoring and longitudinal scoring of a larger glass sheet which has been cracked-off from such glass sheet while avoiding such defects contained in the glass sheet.

What we claim is:

1. Apparatus for continuously cutting a glass sheet into different size pieces containing defects on the basis of detected defect information by automatically computer controlling the transverse and longitudinal scoring of said sheet comprising conveyor means for advancing said sheet in a predetermined direction, defect sensing and computer means associated with said conveyor means for storing the positions of defects in said sheet, first apparatus means for transversely scoring said sheet at predetermined lengths as selected by said computer means, second apparatus means for longitudinally scoring said sheet in parallel lines between the transverse scorings as said sheet is advanced for surrounding detected defects with scorings, and then cracking said sheet into parts along said transverse scoring.

2. Apparatus as claimed in claim 1, wherein the longitudinal scoring apparatus means comprises a multitude of unit cutters lined up along the entire width of glass sheet in a direction perpendicular to the direction of the glass sheet being carried forward in predetermined direction on a conveyor, said unit cutters being respectively and separately movable upwards and downwards and capable of being brought in contact with or out of contact with the glass sheet in its transfer thereby longitudinal scoring is effected by a selective combination of these cutters.

3. Apparatus as claimed in claim 1, wherein the longitudinal coring apparatus means comprises a multitude of unit cutters lined up along the entire width of the glass sheet in a direction perpendicular to the direction of a glass sheet being carried forward in a predetermined direction on a conveyor, and these unit cutters are selectively changed in the area defined by adjacent lines transversely scored substantially in parallel on the surface of the glass sheet by individually controlling said cutters by way of a computer through a longitudinal scoring controller, and a longitudinal scoring is effected in said defined area while avoiding defects contained in the glass sheet in the course of continuous transfer of the glass sheet.

4. Apparatus as claimed in claim 3, said longitudinal scoring controller being is provided with a first correction means for uniformly delaying or accelerating up and down timing signals of a unit cutter at the time when the to be scored are different at each transverse dimension, the longitudinal scoring position varies with each transverse score line. Therefore, the cutters which heretofore have been employed for each transverse score line are raised all together, and then the cutter necessary for next scoring goes down, and, as shown in FIG. 1, the longitudinal score line is to be produced in the area defined by the transverse scored lines. In order to produce the longitudinal score line precisely in the limited area defined by the transverse scored lines in the course of the transfer, strict precision is particularly requested for the up and down movement of said cutter, i.e., the control of replacement of a cutter.

Next, the control of such longitudinal scoring apparatus B will now be explained on the basis of FIG. 3. The computer 16 sends signals to the rising cutter and the falling cutter as in the following method. The computer 16 decides the value of the main counter at the time when the transversely scored glass sheet reaches the longitudinal scoring position with a distance between the transverse scoring apparatus A and the longitudinal scoring apparatus B as a pulse number, and this value of the main counter is automatically set to a longitudinal scoring coincidence circuit 26 by the computer 16, and longitudinal scoring coincidence circuit 26 starts to count at the same time as the transverse scoring by the transverse scoring apparatus A, and at the time when this counting comes in accord with said set numerical value, the signals of rise and fall of the cutter are sent out. Selector signals for these cutters and timing instructions for up and down movement of these cutters are sent to a predetermined unit cutter of the longitudinal scoring apparatus B through a longitudinal scoring controller 25, in which case, the longitudinal cutting cutter has to be controlled in such a way that, as hereinbefore described, the longitudinal score line will certainly enter the area defined by the transverse scored lines. Further, if there occur many parts which actual scoring lines between the initial and final points of the longitudinal score line and the transverse score line cannot be produced, the cracking-off along said longitudinal scored line will become difficult and the cut end of the glass sheet after cracked-off will also become unsatisfactory. For these reasons, the timing of up and down movement of the cutter is of particular importance in the present longitudinal scoring apparatus B.

However, individual unit cutter is subject to mechanical error which will often cause responsive error to the timing instructions given to each cutter. These errors will give inconsistent operation among unit cutters, and simultaneously, the whole operation of these longitudinal scoring cutters is delayed or accelerated relative to said timing instructions. Accordingly, if the cutter is moved up and down as such, it is often impossible to produce longitudinal score lines precisely in the area defined by the transverse scored lines. In the longitudinal scoring controller 25 of the present apparatus, there is provided a means for controlling the up and down timing of each cutter in highest precision so that initial and final scoring of the longitudinal score line can preferably be entered inwards the two transverse scored lines being substantially in parallel. This controlling means comprises a correction means for delaying or accelerating timing of the entire unit cutters as a whole and a correction means for controlling the timing error of the unit cutter individually.

FIG. 5 shows a preferred embodiment of cutter control consisting of a correction circuit of responsive errors for the up and down movement of cutter and a selection part of the unit cutter. In the drawings, the correction means for uniformly delaying or accelerating the whole unit cutters consists of two parts for a rising cutter and for a falling cutter, the former including a coincidence circuit 28 for rising and its time-set dial 29, and the latter a coincidence circuit 30 for falling and ts time-set dial 31. The means for correcting timing of up and down movement of a unit cutter individually includes a delay coincidence circuit and its incidential circuit.

The separation counter 27 counts always pulses from the pulse generator 13, in order to grasp precisely the position of the glass sheet and its speed at all times and, upon receiving replacement signals from said longitudinal scoring coincidence circuit 26 (FIG. 3), begins its counting and, when the coincidence circuit 28 for rising and the coincidence circuit 30 for falling operate, it resets and waits for next replacement signals. The coincidence circuit 28 for rising and the coincidence circuit 30 for falling are, as hereinbefore described, the first correction means for delaying or accelerating the entire replacement signals respectively for the rising cutter and the falling cutter and determines the time to be delayed or accelerated in collation of the longitudinal scored line which actually has been produced on the glass sheet. If timing for the rising cutter is delayed or accelerated uniformly, the time is set by a time-set dial 29. For the falling cutter, it is set by a time-set dial 31, and when the counting of the coincidence circuit comes in accord with this set value, signals are sent to the next delay coincidence circuit through a counter 33 for rising and a counter 34 for falling. Thus, the replacement signals are uniformly delayed or accelerated. The result of this correction is available for facilitating individual correction of unit cutters as hereinafter set forth.

Next, the second correction in which timing of up and down movement is performed for each unit cutter will now be described particularly in respect to a case of the rising signal. This correction circuit is constituted so that count is commenced simultaneously when the counting set value provides different delay coincidence circuits, for example, of 4, 8, 12, 16, 20, 24, and these coincidence circuits and aforesaid coincidence circuits 28 for rising are respectively connected, and receives rising signals from the coincidence circuit 28 for rising and sends signals when the counting value becomes 4, 8, 12, 16, 20, 24. By setting one counter of each delay coincidence circuit in this case at ¼ mm. for the marching distance of the glass sheet, viz., the coincidence circuit of the counting value 4 delays the time of the unit cutter for rising as much as the glass advances 1 mm., and the coincidence circuit of the counting value 8 delays the time as much as 2 mm. respectively. Said each delay coincidence circuit delays the time of a unit cutter for rising corresponding to the marching distance of the glass sheet. Such second correction is fulfilled only by the delay by way of the first correction of a rising signal. Further, since the speed of glass sheet is measured always by the counter 33 for rising, the amount of correction may be selected corresponding to the conditions of the longitudinal scored line actually produced even though the speed of glass sheet may change.

Each signal from the delay coincidence circuit is rectified subsequently by means of a stable circuit M.M., for instance, to a pulse width of $\frac{1}{10}$ sec. and amplified and thereafter sent to a delay selective disc. This selective disc is a place where each unit cutter provided in a great number in parallel on the fitting support frame 3 as in FIG. 1, is connected to best suited coincidence signal of said six signals. Connecting terminals of number of cutters X6 are provided therefor and to these terminals is connected a lead wire 35, one end of which is connected to an electromagnetic valve coil of a unit cutter. In the drawings, the first unit cutter is connected to a coincidence signal of 5 mm. delay and the second, the third, the fourth cutter thus in order are respectively connected to 4 mm., 6 mm., 3 mm., delay coincidence signals.

Selection of actually rising cutters will now be illustrated. FIG. 5 shows a case where a changer onto a reserve apparatus B' (FIG. 3) is provided and particularly in respect to the third cutter. Changing of the present apparatus B to the reserve apparatus B' is carried out autocutter is changed and a second correction means for controlling such corrected timing signals for each unit cutter, responsive errors of each unit cutter relative to the up and down instructions from the computer being cancelled or corrected, and longitudinal score lines are precisely produced in the area defined by two adjacent transverse scored lines on the glass sheet in the course of its transfer.

5. Apparatus as claimed in claim 1, wherein the transverse scoring apparatus and longitudinal scoring apparatus usually employed are respectively provided with a transverse scoring reserve apparatus and a longitudinal scoring reserve apparatus in parallel and when said apparatus becomes inoperative, it can be changed over by the reserve apparatus automatically or manually.

References Cited

UNITED STATES PATENTS

| | | | |
|---|---|---|---|
| 3,141,589 | 7/1964 | Jochim | 225—96.5 X |
| 3,244,337 | 4/1966 | Curtze et al. | 83—402 X |
| 3,246,550 | 4/1966 | Galey et al. | |
| 3,274,390 | 9/1966 | Umbel | 225—96.5 X |
| 3,282,140 | 11/1966 | Shinsuke Sasabuchi et al. | 225—96.5 X |
| 3,343,436 | 9/1967 | Cockrell | 83—11 |
| 3,352,015 | 11/1967 | Galabert et al. | 83—7 X |

JAMES M. MEISTER, *Primary Examiner.*

U.S. Cl. X.R.

83—10, 11